(12) United States Patent
Henry et al.

(10) Patent No.: US 8,503,070 B1
(45) Date of Patent: Aug. 6, 2013

(54) FIBER ACTIVE PATH LENGTH SYNCHRONIZATION

(75) Inventors: Leanne J. Henry, Albuquerque, NM (US); Thomas M. Shay, Albuquerque, NM (US)

(73) Assignee: The United States of America as Represented by The Secretary of the Air Force, Washington, DC (US)

( * ) Notice: Subject to any disclaimer, the term of this patent is extended or adjusted under 35 U.S.C. 154(b) by 176 days.

(21) Appl. No.: 13/114,374

(22) Filed: May 24, 2011

(51) Int. Cl.
*H04B 10/17* (2006.01)

(52) U.S. Cl.
USPC .................. 359/341.1; 359/337; 359/349

(58) Field of Classification Search
USPC ....................... 359/337, 341.1, 349
See application file for complete search history.

(56) References Cited

U.S. PATENT DOCUMENTS

| | | | |
|---|---|---|---|
| 5,694,408 A * | 12/1997 | Bott et al. | 372/6 |
| 5,723,856 A | 3/1998 | Yao | |
| 5,929,430 A | 7/1999 | Yao | |
| 6,200,309 B1 * | 3/2001 | Rice et al. | 606/10 |
| 6,317,257 B1 * | 11/2001 | Upton et al. | 359/349 |
| 6,678,294 B1 * | 1/2004 | Komine et al. | 372/38.01 |
| 7,058,098 B1 | 6/2006 | Shay | |
| 7,187,492 B1 | 3/2007 | Shay | |
| 7,187,870 B2 | 3/2007 | Ilchenko et al. | |
| 7,233,433 B1 | 6/2007 | Shay | |
| 7,324,256 B1 | 1/2008 | Sayyah | |
| 7,534,990 B2 | 5/2009 | Yao | |
| 2009/0134310 A1 * | 5/2009 | Goodno | 250/201.9 |
| 2009/0185176 A1 * | 7/2009 | Livingston et al. | 356/237.2 |
| 2010/0044106 A1 * | 2/2010 | Zediker et al. | 175/16 |

OTHER PUBLICATIONS

Goodno et al Optics Letters, vol. 35, No. 10, pp. 1542-1544, 2010.

* cited by examiner

*Primary Examiner* — Eric Bolda
(74) *Attorney, Agent, or Firm* — James M. Skorich; Kenneth E. Callahan

(57) ABSTRACT

A method of implementing a high-power coherent laser beam combining system in which the output of a master oscillator laser having a linewidth broader than the Stimulated Brillouin Scattering linewidth of the laser signal is split into N signals and fed into an array of N optical fibers. This is a modification of the self-synchronous LOCSET and self-referenced LOCSET phase matching systems in which the optical path length of each optical fiber is matched to less than the signal coherence length of the master oscillator by using a path length matching signal processor to modulate temperature controlled segments of each optical fiber.

3 Claims, 9 Drawing Sheets

Block Diagram of the Self-Synchronous LOCSET System with Fiber Path Length Matching Improvement Self-Synchronous Locking of Optical Coherence by
Single-detector Electronic-frequency Tagging
Prior Art - US Patent 7,058,098

Self-Referenced Locking of Optical Coherence by
Single-detector Electronic frequency Tagging
Prior Art – US Patent 7,233,433

Block Diagram of the Self-Synchronous LOCSET System with Fiber Path Length Matching Improvement Optical Phase and Path Length Matching Control Loops for the Self-Synchronous LOCSET System Block Diagram of the Self-Referenced LOCSET System with Fiber Path Length Matching Improvement Optical Phase and Path Length Matching Control Loops for the Self-Referenced LOCSET System Hybrid Self-Synchronous Self-Referenced LOCSET System with the fiber path length matching improvement Optical Phase and Path Length Matching Control Loops for the Hybrid Self-Synchronous Self-Referenced LOCSET System for a Non-Reference Leg Optical Phase Matching Control Loop for the Hybrid Self-Synchronous Self-Referenced LOCSET System for a Reference Leg

FIBER ACTIVE PATH LENGTH SYNCHRONIZATION

STATEMENT OF GOVERNMENT INTEREST

The conditions under which this invention was made are such as to entitle the Government of the United States under paragraph 1(a) of Executive Order 10096, as represented by the Secretary of the Air Force, to the entire right, title and interest therein, including foreign rights.

BACKGROUND OF THE INVENTION

The present invention relates generally to multiple element optical amplifier arrays used to achieve a high output power laser beam and in particular, to a system to enable coherent beam combination of laser amplifier arrays.

The intensity and, hence, the power available from a single-mode optical fiber is limited by either optical surface damage or nonlinear optical effects. The limitations to achieving a high power fiber laser system can be overcome by coherent beam combination of the output power from multiple, broader linewidth optical fiber amplifiers. In a master oscillator power amplifier (MOPA) configuration having multiple fiber amplifier legs, the optical path lengths of each of the amplifier legs have to be controlled to a tighter and tighter tolerance level as the linewidth of the source increases. In addition, fine control of the optical phase is required in order to enable coherent combination of the individual amplifier outputs into a single, high-power beam. As a result of time varying thermal loads and other disturbances, an active feedback system is required in order to provide for both coherent addition and rapid slewing of the final beam direction.

Two systems for electronic phase locking of optical arrays to achieve a high power beam is the subject of three patents by one of the present inventors (T. M. Shay, "Self-referenced Locking of Optical Coherence by Single-detector Electronic-frequency Tagging," U.S. Pat. No. 7,187,492 B1, T. M. Shay, "Self-Synchronous Locking of Optical Coherence by Single-detector Electronic-frequency Tagging," U.S. Pat. No. 7,058,098 B1, and T. M. Shay, "Self-referenced Locking of Optical Coherence by Single-detector Electronic-frequency Tagging," U.S. Pat. No. 7,233,433 B1). These patents are hereby incorporated by reference.

The Self-Synchronous Locking of Optical Coherence by Single-detector Electronic-frequency Tagging (Self-Synchronous LOCSET) system (U.S. Pat. No. 7,058,098 B1) provides a simple and robust method that needs only a single detector and has no reference leg. The phase errors between the individual array elements self adjust so that the mean phase error is zero, thereby maximizing the power in the central lobe. The Self-Referenced LOCSET system is also a simple and robust method that needs only a single detector, but has one reference leg. The phase-modulated (slave) array elements are adjusted to track the phase of the unmodulated (reference) element. Both embodiments of LOCSET can easily be scaled to large numbers of array elements because the scaling is done in the electronic instead of the spatial domain. This technology is applicable to general systems of laser amplifiers, i.e., semiconductor, bulk solid state, gas, dye, as well as fiber amplifiers.

Self-Synchronous LOCSET

In the Self-Synchronous LOCSET system, the phases of the individual array elements self-adjust so that the mean array phase error is zero. A block diagram of the Self-Synchronous LOCSET is shown in FIG. 1. The diagram begins with a master oscillator 1. There may or may not be an optical amplifier incorporated in the master oscillator laser. The output power from the master oscillator is divided by a 1×N power splitter 2. Each of the N output signals from the 1×N power splitter 2 are then directed to N optical modulators 3 where each of the N signals is phase modulated by a unique electronic frequency. The modulation frequencies must be selected so that beat notes of the N elements can be uniquely isolated. The errors signals for each of the N elements are fed to N phase adjusters 4 and then to optical amplifiers 5. The optical modulators 3 and the optical phase adjusting elements 4 can be separate devices, or they may be single devices that perform both tasks. The outputs from the optical amplifiers 5 are then directed to the array output optics 6. The relative position of the optical amplifiers 5, the optical modulators 3, and the phase adjusters 4 are in principle arbitrary. However, practical details such as power handling capability of individual elements, system noise characteristics, or even reduction of the modulation effectiveness by succeeding elements may lead to a preferred sequence of optical elements.

Next, the N amplified outputs are optically co-aligned in the alignment optics 6 and the output is directed to the beam sampler 7. In the case where the output array optics 6 contains a beam combiner, the output may be a single beam. In a variation of this embodiment, the beams may be sampled before the alignment optics. In that case the beam sampler 7 may precede the co-alignment optics 6. While the majority of the power passes through the beam splitter 7 and constitutes the array output 8, a small fraction of the array output is directed to the far field imaging optics 9 and then on to the photodetector 10. The imaging system 9 is used to image a far-field central spot onto the photodetector 10 that fills or overfills the active area of the photodetector 10. The signal-to-noise ratio for a given optical power in the sampled beam is optimized when only the central lobe of the far field is imaged onto the photodetector. However, this is not a necessary condition for achieving accurate phase control. Excellent phase locking can be achieved when the central lobe overfills or underfills the photodetector active area. It is only necessary that there be a sufficient signal-to-noise ratio for phase locking.

The electrical signals from the photodetector 10 are signal processed 11 to isolate and extract the optical phase control signals for each array element, and the optical phase control signals are then applied to the phase adjusting elements 4 using negative feedback to cancel the phase difference between the array elements. Optimum performance is obtained when the array elements are all traveling in the same direction with the same divergence. However, the optimum condition is not required for excellent phase control to be demonstrated.

The output power of a narrow linewidth fiber amplifier is limited by Stimulated Brillouin Scattering (SBS). The SBS threshold is currently the limiting nonlinear process in single frequency fiber amplifiers. A simple way to mitigate Stimulated Brillouin Scattering and increase the power available from a single fiber amplifier is to broaden the master oscillator linewidth beyond the SBS line width. While this is an effective technique for mitigating SBS it presents problems for active coherent beam combination since the coherence length is inversely proportional to the linewidth and decreases as the linewidth increases.

The output power of an amplifier system using Self-Synchronous LOCSET for phase locking may, therefore, be enhanced if the master oscillator linewidth is broadened beyond the Stimulated Brillouin Scattering (SBS) linewidth. This allows the output powers of the individual fiber amplifier legs to be increased with a consequent, increase in the total output power of the fiber laser system. However, the optical path length of each amplifier chain must then be matched to within the coherence length of the master oscillator. The enhancement of LOCSET to enable simultaneous optical phase and path length matching is a subject of the present invention. The invention may also be used to path length match and phase lock passive optical systems and to measure path length differences in broad line interferometric applications, such as optical coherence tomography.

Self-Referenced LOCSET

In the Self-referenced LOCSET system (U.S. Pat. No. 7,187,492 B1 and U.S. Pat. No. 7,233,433 B1), one signal is designated a reference signal while the M=N−1 remaining (slave) signals are optically phase adjusted relative to the reference. A diagram of this system is shown in FIG. 2. The diagram begins with a master oscillator 21. There may or may not be an optical amplifier incorporated in the master oscillator laser. The output power from the master oscillator is divided by a 1×N power splitter 22. The M output slave signals from the 1×N power splitter 22 are then directed to M optical modulators 23 where each of the M signals is modulated by a unique electronic frequency. The remaining reference signal from the 1×N power splitter 22 is also sent through an optional optical modulator 32 and is designated the reference signal. The modulation frequencies must be selected so that beat notes between the reference and the other M slave elements can be uniquely isolated. The M slave signals are fed to M phase adjusters 24 and then to optical amplifiers 25. The reference signal proceeds directly from the 1×N power splitter 22 through an optical modulator 32 which may not be present to an optical amplifier 25. The optical modulators 23 and the optical phase adjusting elements 24 can be separate devices, or they may be single devices that perform both tasks. The outputs from the optical amplifiers 25 are then directed to the array output optics 26. The relative positions of the optical amplifiers 25, the optical modulators 23, and the phase adjusters 24 on the slave legs are in principle arbitrary. The relative positions of the optical amplifier 25 and the optical modulator 32, if it exists, on the reference leg are also arbitrary. However, for both the slave and reference legs, practical details such as power handling capability of the individual elements, system noise characteristics, or even reduction of the modulation effectiveness by succeeding elements may lead to a preferred sequence of optical elements.

Next the N amplified outputs are optically co-aligned in the alignment optics 26 and the output is directed to the beam sampler 27. In the case where the output array optics 26 contains a beam combiner, the output may be a single beam. In a variation of this embodiment, the beams may be sampled before the alignment optics. In that case the beam sampler 27 may precede the co-alignment optics 26. While the majority of the power passes through the beam splitter 27 and constitutes the array output 28, a small fraction of the array output is directed to the far field imaging optics 29 and then on to the photodetector 30. The imaging system 29 is used to image a far-field central spot onto the photodetector 30 that fills or overfills the active area of the photodetector 30. The signal-to-noise ratio for a given optical power in the sampled beam is optimized when only the central lobe of the far field is imaged onto the photodetector. However, this is not a necessary condition for achieving accurate phase control. Excellent phase locking can be achieved when the central lobe overfills or underfills the photodetector active area. It is only necessary that there be a sufficient signal-to-noise ratio for phase locking.

The electrical signals from the photodetector 30 are signal processed 31 to isolate and extract the optical phase control error signals for each array (slave) element, and the optical phase control signals are then applied to the phase adjusting elements 24 using negative feedback to cancel the phase difference between the array (slave) elements and the reference element. Optimum performance is obtained when the array elements are all traveling in the same direction with the same divergence. However, the optimum condition is not required for excellent phase control to be demonstrated.

The output power of an amplifier system using the Self-Referenced LOCSET phase-locking system may also be enhanced if the master oscillator linewidth is broadened beyond the Stimulated Brillouin Scattering (SBS) linewidth. Because the output powers of the individual fiber amplifier legs are increased due to a higher threshold for Stimulated Brillouin Scattering, the total output power of the overall fiber amplifier system will be increased. Again, the optical path length of each amplifier chain must then be matched to within the coherence length of the master oscillator. This enhancement is also a subject of the present invention.

Recently, Goodno et al Optics Letters, Vol. 35, No. 10, pp. 1542-1544, 2010 demonstrated an actively phase-locked coherent beam combining system emitting 1.43 kW of single-mode power when seeded with a 25 GHz linewidth master oscillator. However, efficient beam combination required that the optical path lengths be matched to within 1-mm. To achieve this path length matching mechanical optical trombones were used. However, mechanical optical trombones are devices that are vibration sensitive and therefore require very rigid and expensive vibration isolation systems. Mechanical sensitivity may make these systems unsuitable for many potential applications. An alternative method for matching the optical fiber path lengths is to splice additional fiber onto the fiber system to match the optical paths. While this sounds straight forward it is difficult to do with current fiber fusing technology because the fiber length added can generally be controlled only to an accuracy of a few centimeters due to uncertainty in the quality of the fiber cleaving and fusing processes. Thus this approach is not suitable for path length matching of a large number of broad linewidth optical fibers since the optical paths must be matched to within less than the coherence length which may be quite small.

Another approach is to utilize the fiber coupled optical trombone described by Yao in U.S. Pat. No. 7,534,990 B2 to obtain path length matching. An additional technique for optical path length matching is to utilize a piezoelectric fiber stretcher to bring about small changes in the path length of the optical fiber. (See Yao et al, U.S. Pat. No. 5,723,856, Yao et al, U.S. Pat. No. 5,929,430, Ichenko et al, U.S. Pat. No. 7,187,870 B2, and Sayyah U.S. Pat. No. 7,324,256 B1.) However, these devices have two problems, first they are microphonic as well as vibration sensitive and second their dynamic range is generally limited to small changes in the path length.

As mentioned above, broader linewidth lasers can effectively mitigate SBS, thus eliminating the major effect that limits the output power of beam combinable fiber lasers. This, however, incurs the added penalty of requiring accurate path length matching systems. Because vibration sensitivity is an issue for some applications, some forms of path length matching will be unsuitable. Because the present invention is an all-fiber system that doesn't contain any mechanical devices or free space optics, excellent performance is expected in an environment where vibrations are present. Finally, it is generally assumed that unless all of the path lengths are matched, the control loop will not operate. While this is generally true, the present invention circumvents this by utilizing a technique that separates out the control loop signal for each array element, i.e., the incoherence induced by any array element beams that are not path length matched will not interfere with the phase locking of those that are path length matched.

SUMMARY

The power available from a single-mode optical fiber is limited by either optical surface damage or nonlinear optical effects. The primary limitation on the output power of a narrow linewidth optical fiber is the nonlinear optical effect of Stimulated Brillouin Scattering (SBS).

One way to mitigate SBS and thereby increase the power available is to broaden the master oscillator linewidth beyond the SBS linewidth increasing the SBS threshold. Coherent beam combination of the output power from multiple optical fibers has been one way to obtain an output power from a system greater than that obtainable from an individual fiber. In this method, a single master oscillator seeds an array of power amplifiers whose outputs are locked in phase using active feedback. However broadening the linewidth of the master oscillator to further increase the output power of each optical fiber necessitates highly accurate path length matching. The present invention embodies a novel, all-fiber, method for path length matching where feedback to a temperature controlled segment of optical fiber within each amplifier leg is used to increase or decrease the fiber path length. Accurate path length matching between the amplifiers is thereby enabled.

DESCRIPTION OF THE PREFERRED EMBODIMENT

Figure 1:
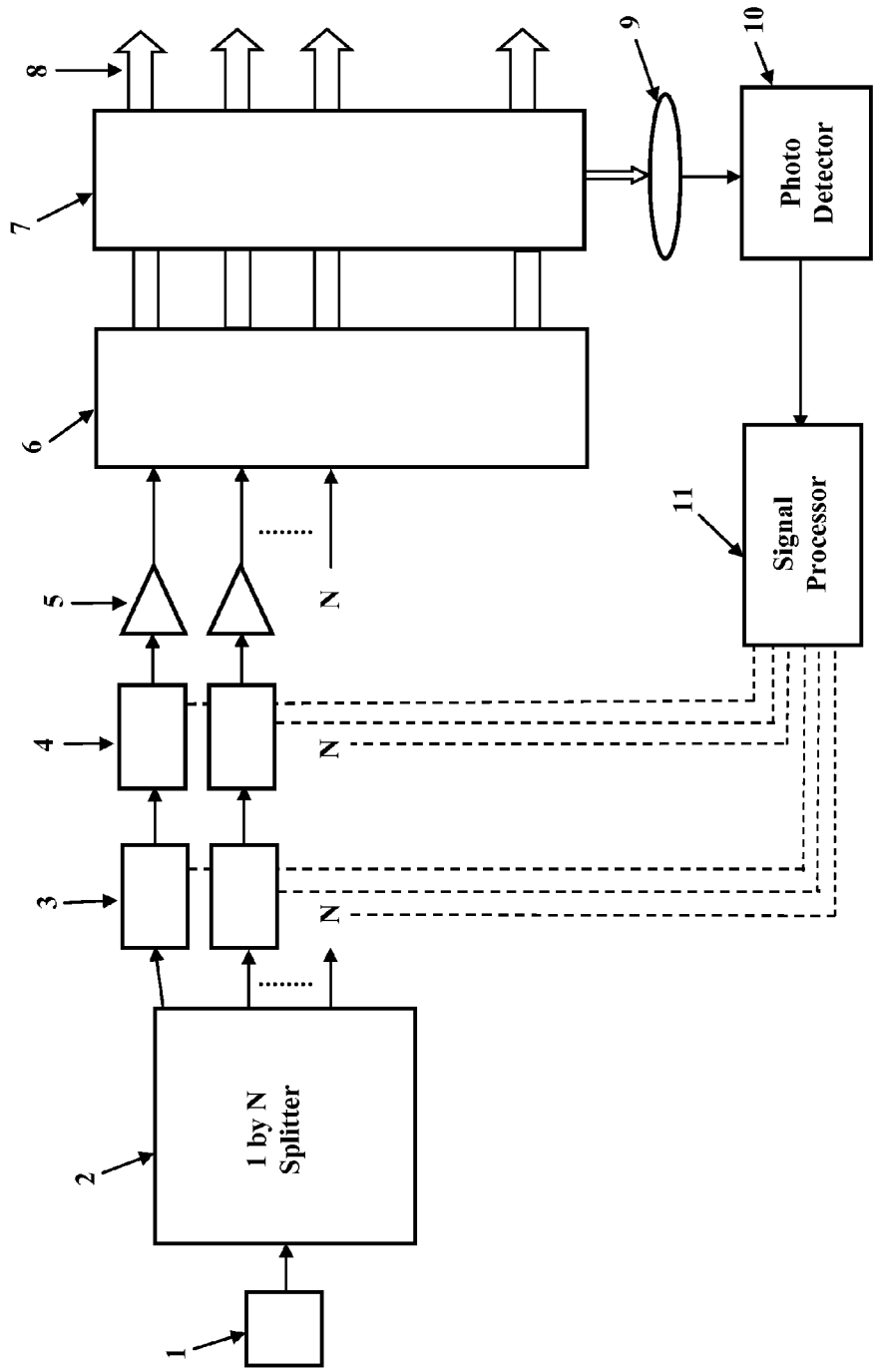
FIG. 1 is a block diagram for the prior art Self-Synchronous Locking of Optical Coherence by Single-detector Electronic-frequency Tagging (LOCSET) system of U.S. Pat. No. 7,058,098.
Figure 2:
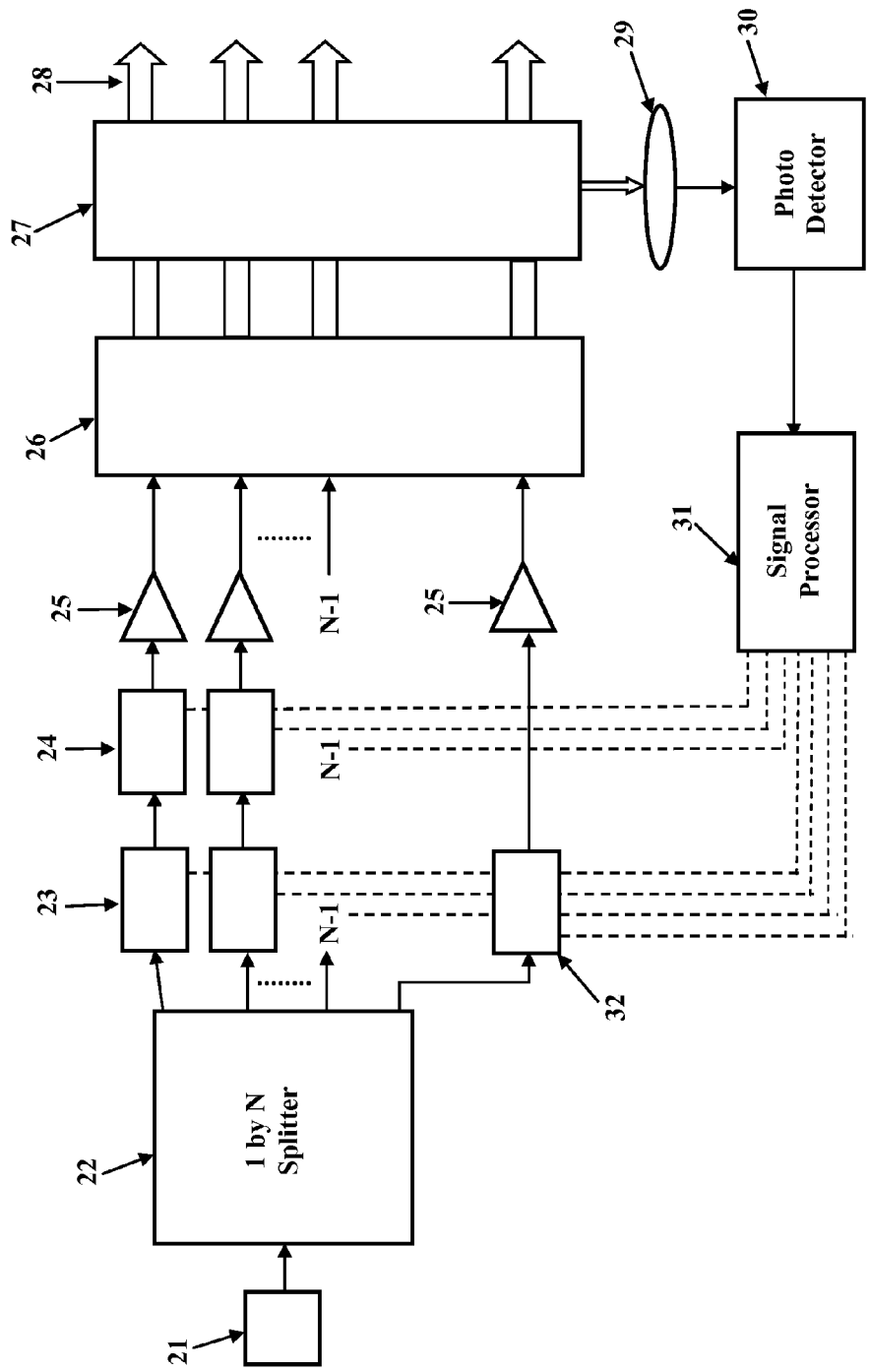
FIG. 2 is a block diagram for the prior art Self-Referenced Locking of Optical Coherence by Single-detector Electronic-frequency Tagging (LOCSET) system of U.S. Pat. No. 7,233,433.
Figure 3:
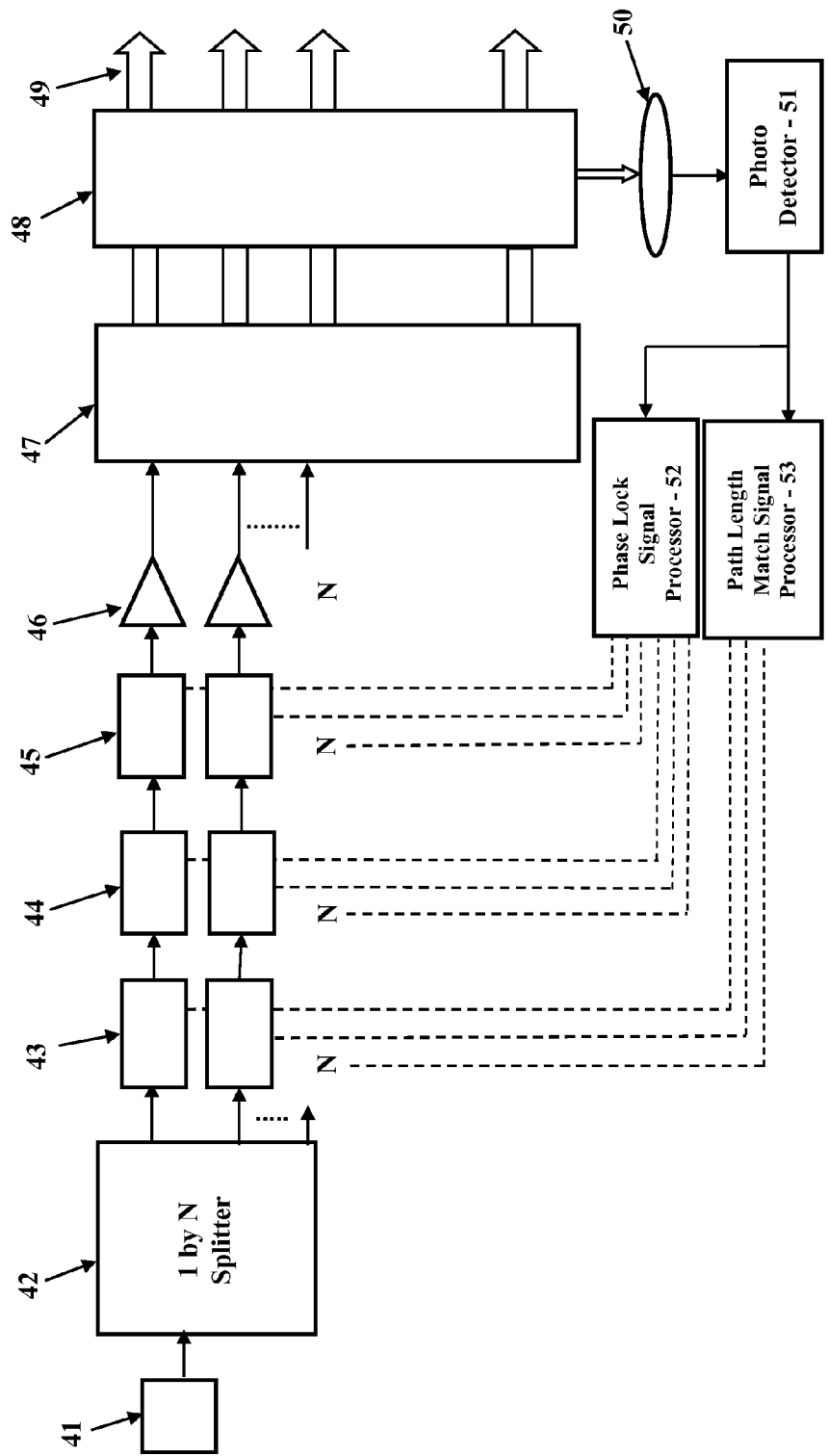
FIG. 3 is a block diagram of the Self-Synchronous LOCSET system with the fiber path length matching improvement.

Self-Synchronous LOCSET system with the fiber path length matching improvement In the embodiment for Self-Synchronous LOCSET with the fiber path length matching improvement, N fiber amplifier legs are adjusted for both optical phase and path length matching. A block diagram for this embodiment of the present invention is shown in FIG. 3. The first device in the diagram is a master oscillator laser 41 having a linewidth greater than the SBS linewidth. The output power from the master oscillator is divided by a 1×N power splitter 42. Each of the N output signals from the 1×N power splitter 42 are then directed to N temperature controlled spools of passive optical fiber 43 where the temperature of each of the N fiber spools is adjusted to match the optical path length of the array elements. Each of the N output signals from the N temperature controlled spools of passive optical fiber 43 are then directed to N optical modulators 44 where each of the N signals is modulated by a unique electronic frequency. The modulation frequencies must be selected so that beat notes between the N optical signals can be uniquely isolated. The N signals are then fed to N phase adjusters 45 and then to optical amplifiers 46 which are optional. The optical modulators 44 and the optical phase adjusting elements 45 can be separate devices, or they may be single devices that perform both tasks. The outputs from the optional optical amplifiers 46 are then directed to the array output optics 47. The relative position of the optional optical amplifiers 46, the optical modulators 44, the phase adjusters 45, and the temperature controlled spools of passive optical fiber 43 are in principle arbitrary. However, practical details such as power handling capability of individual elements, system noise characteristics, or even reduction of the modulation effectiveness by succeeding elements or thermal loading may lead to a preferred sequence of optical elements.

Next the N amplified outputs are either optically co-aligned or combined in the combiner/alignment optics 47 and, the output is directed to the beam sampler 48. In the case where the output array optics 47 contains a beam combiner, the output may be a single beam. In a variation of this embodiment, the beams may be sampled before the alignment optics. In that case the beam sampler 48 may precede the co-alignment optics 47. While the majority of the power passes through the beam splitter 48 and constitutes the array output 49, a small fraction of the array output is directed to the far field imaging optics 50 and then on to the photodetector 51. The imaging system 50 is used to image a far-field central spot onto the photodetector 51 that fills or overfills the active area of the photodetector 51. The signal-to-noise ratio for a given optical power in the sampled beam is optimized when only the central lobe of the far field is imaged onto the photodetector. However, this is not a necessary condition for achieving accurate phase control or path length matching. Excellent phase locking and path length matching can be achieved when the central lobe overfills or underfills the photodetector active area. It is only necessary that there be a sufficient signal-to-noise ratio for phase locking and path length matching.

The electrical signals from the photodetector 51 are signal processed 52 to isolate and extract the optical phase control signals for each array element, and the optical phase control signals are then applied to the phase adjusting elements 45 to cancel the phase differences between the array elements. Optimum performance is obtained when the array elements are all traveling in the same direction with the same divergence. However, the optimum condition is not required for excellent phase control to be demonstrated. The signal from the photodetector 51 is also sent to the path length matching signal processor 53 which sends the path length matching control signal to the temperature controlled fiber spools 43 to enable path length matching relative to an array mean.

The theoretical basis for self-synchronous LOCSET signal processing 52 has been described in U.S. Pat. No. 7,058,098 B1.

A method for matching the path lengths of N fibers is next described for the Self-Synchronous LOCSET system with the fiber path length matching improvement. The method uses electronic feedback control of the optical path lengths in N fibers to provide continuous optical path length adjustments over a wide range of path length differences with high accuracy so that efficient path length matching and phase locking can be achieved. To achieve good phase locking, the optical path length differences between the amplifier legs must be much less than the coherence length of the master oscillator. In the present invention, the path lengths of the individual fibers are matched relative to an array mean using feedback to temperature-controlled segments of passive fiber in each of the amplifier legs. The feedback system changes the optical path lengths by adjusting the temperature of the passive fiber in each optical amplifier legs to enable the path length to increase or decrease.

For all embodiments of LOCSET with the fiber path length matching improvement described in this patent, a temperature controlled fiber segment has a dynamic range, $\Delta L_{max}$, equal to the product of the length of the temperature controlled segment, $L_{control}$, times the coefficient for change in the optical path length versus temperature for the fiber, $\alpha_{fiber}$, times the maximum temperature swing for the controlled fiber, $\Delta T_{max}$, that is, $$\Delta L_{max} = L_{control} \cdot \alpha_{fiber} \cdot \Delta T_{max} \quad (1)$$

Also, for all embodiments of LOCSET with the fiber path length matching improvement described in this patent, the required temperature control resolution, is given by $$\delta T_{min} < \delta L_{tolerance} / (L_{control} \cdot \alpha_{fiber}) \quad (2)$$

where $\delta L_{tolerance}$ is L the minimum tolerance path length matching with $L_{control}$ and $\alpha_{fiber}$ being defined as before. As the linewidth broadens and the coherence length decreases, $\delta L_{tolerance}$ also decreases. As a result, the required temperature control resolution, $\delta T_{min}$, becomes more and more stringent since fluctuations in temperature directly lead to fluctuations in the optical path length which could lead to incoherence. That is, as the coherence length decreases, $\delta T_{min}$ also decreases.

In all embodiments of LOCSET with the fiber path length matching improvement described in this patent, the first harmonic term is utilized to carry the optical phase lock errors while the path length matching system uses a multiple (even or odd) of the first harmonic to carry the path length matching error signals. When an even harmonic is used, any appropriate hill-climbing algorithm or other maximum-seeking system can be utilized and path length matching is optimized when the error signals are maximized. When an odd harmonic is utilized, path length matching is optimized when the error signals are minimized. For all embodiments, the path length matching control loop must not interfere with the phase locking control loop so that the phase locking and the path length matching error signals are independent of each other. Utilization of a multiple (even or odd) of the first harmonic results in a simplification of the system since the same single frequency sine wave signal can be leveraged to control both the optical phase and the path length. Finally, instability as well as strength of signal issues may limit which harmonics can be used for path length matching. To conclude, this method makes it possible to automatically and actively compensate for dynamic changes in the optical path length as long as they don't happen faster than the control loop response time.

In all embodiments of LOCSET with the fiber path length matching improvement utilizing an even harmonic for path length matching, path length matching is optimized for the $l^{th}$ element when the following signal is maximized:

$$S_{PLM\_l} = \frac{1}{\tau} \cdot \int_0^{\tau_P} [\cos(n_{even} \cdot \omega_l \cdot t) \cdot i_{PD}(t)] \cdot dt \quad (3)$$

and for all embodiments of LOCSET with the fiber path length matching improvement utilizing an odd harmonic for path length matching, path length matching is optimized for the $l^{th}$ element when the following signal is minimized:

$$S_{PLM\_l} = \frac{1}{\tau} \cdot \int_0^{\tau_P} [\sin(n_{odd} \cdot \omega_l \cdot t) \cdot i_{PD}(t)] \cdot dt \quad (4)$$

where $n_{even}$ represents an even integer greater than 0, $n_{odd}$ represents an odd integer greater than 0, $\omega_l$ represents the RF phase modulation frequency for the $l^{th}$ array element, $\tau_p$ represents the integration time for the path length matching error signal, and $ip_D(t)$ represents the detector photocurrent induced by the photons from the fiber array.

For both harmonics, $\tau_p$ should be longer than the thermal response time of the temperature controlled fiber and shorter than the time scale of optical path length fluctuations large enough to reduce coherent combination efficiency. All embodiments of LOCSET with fiber path length matching improvement must be implemented in conjunction with the following U.S. Pat. Nos. 7,187,492 B1, 7,058,098 B1, and 7,233,433 B1.

For N modulated elements, the photocurrent for the self-synchronous case is given by:

$$i_{PD}^{Self-synchronous}(t) = \frac{R_{PD}}{2} \sum_{l=1}^{N} \sqrt{P_l} \cdot \sum_{\substack{j=1 \\ j \neq l}}^{N} \sqrt{P_j} \cdot \left[ \left\{ \cos(\phi_l - \phi_j) \right. \right. \quad (5)$$

$$\left( J_0(\beta_l) + 2 \cdot \sum_{n_l=1}^{\infty} J_{2n_l}(\beta_l) \cdot \cos(2 \cdot n_l \cdot \omega_l \cdot t) \right) \cdot$$

$$\left( J_0(\beta_j) + 2 \cdot \sum_{n_j=1}^{\infty} J_{2n_j}(\beta_j) \cdot \cos(2 \cdot n_j \cdot \omega_j \cdot t) \right) \right\} -$$

$$\left\{ \sin(\phi_l - \phi_j) \cdot 2 \cdot \sum_{n_l=1}^{\infty} J_{2n_l-1}(\beta_l) \cdot \right.$$

$$\sin((2 \cdot n_l - 1) \cdot \omega_l \cdot t) \cdot \left( J_0(\beta_j) + 2 \cdot \right.$$

$$\left. \left. \sum_{n_j=1}^{\infty} J_{2n_j}(\beta_j) \cdot \cos(2 \cdot n_j \cdot \omega_j \cdot t) \right) \right\} +$$

$$\left\{ \sin(\phi_l - \phi_j) \left( J_0(\beta_l) + 2 \cdot \sum_{n_l=1}^{\infty} J_{2n_l}(\beta_l) \cdot \cos(2 \cdot \right. \right.$$

-continued $$n_l \cdot \omega_l \cdot t)) \cdot \left(2 \cdot \sum_{n_j=1}^{\infty} J_{2n_j-1}(\beta_j) \cdot \text{Sin}(\right.$$

$$\left.(2 \cdot n_j - 1) \cdot \omega_j \cdot t))\right) + \left\{\text{Cos}(\phi_l - \phi_j) \cdot 2 \cdot \right.$$

$$\sum_{n_j=1}^{\infty} J_{2n_j-1}(\beta_j) \cdot \text{Sin}\left(\left(2 \cdot n_j - 1\right) \cdot \omega_j \cdot t\right) \cdot \left(2 \cdot \right.$$

$$\left.\left.\sum_{n_l=1}^{\infty} J_{2n_l-1}(\beta_l) \cdot \text{Sin}((2 \cdot n_l - 1) \cdot \omega_l \cdot t))\right\}\right]$$

where $R_{PD}$ represents the photodetector responsivity, N represents the number of array elements, $\omega_l$ and $\omega_j$ represents the RF modulation frequencies of the $l^{th}$ and $j^{th}$ elements, $\phi_l$ and $\phi_j$ represent the optical phases of the $l^{th}$ and $j^{th}$ array elements, $P_l$ and $P_j$ represent the power from the $l^{th}$ and $j^{th}$ array elements that are incident upon the photodetector, $\beta_l$ and $\beta_j$ represent the phase modulation amplitudes of the $l^{th}$ and $j^{th}$ array elements, and $J_m(\beta)$ represents a Bessel Function of the first kind of order m.

If $\tau_p \gg 2\pi/\omega_l$ and $\tau_p \gg 2\pi/|(\omega_l - \omega_j)|$ a for all l and j when $j \neq l$, then the path length error signal for the $l^{th}$ array element for even orders of the path length modulation frequency is to an excellent approximation given by, $$S_{PLM\_l}^{even} = \frac{R_{PD}}{2} \cdot \sqrt{P_l} \cdot J_{n_{even}}(\beta_l) \cdot \sum_{j=1}^{N} J_0(\beta_j) \cdot \left[\sqrt{P_j} \cdot \text{Cos}(\phi_j - \phi_l)\right] \quad (6)$$

providing that the phases of the array elements are locked, that is, $\phi_l$ is close to $\phi_j$. For odd orders of the path length modulation frequency, the path length error signal for the $l^{th}$ array element is to an excellent approximation given by, $$S_{PLM\_l}^{odd} = \frac{R_{PD}}{2} \cdot \sqrt{P_l} \cdot J_{n_{odd}}(\beta_l) \cdot \sum_{j=1}^{N} J_0(\beta_j) \cdot \left[\sqrt{P_j} \cdot \text{Sin}(\phi_j - \phi_l)\right] \quad (7)$$

also providing that $\phi_l$ is close to $\phi_j$.

When the path length matching control loop is turned on, the temperature of the path length matching fiber may need to be scanned while the phase locking (LOCSET) loop is operating so that the path length differences are within the control loop pull in range. In principle, path length matching and coherence amongst the various fiber amplifier legs needs to occur before optical phase matching can be accomplished. However, once the path lengths are partially matched, the phase locking control loop will automatically pull in the path length matching providing that the response time of the phase lock control loop is much faster than the path length matching control loop. When both the optical phase and path length matching control loops are operating and the path lengths are matched to within the coherence length, the path length matching control loop will compensate for the slower, macroscopic, changes in phase while the optical phase control loop will compensate for the more rapid, microscopic, changes in phase. This pertains to all embodiments of LOCSET with the fiber path length matching improvement.

Figure 4:
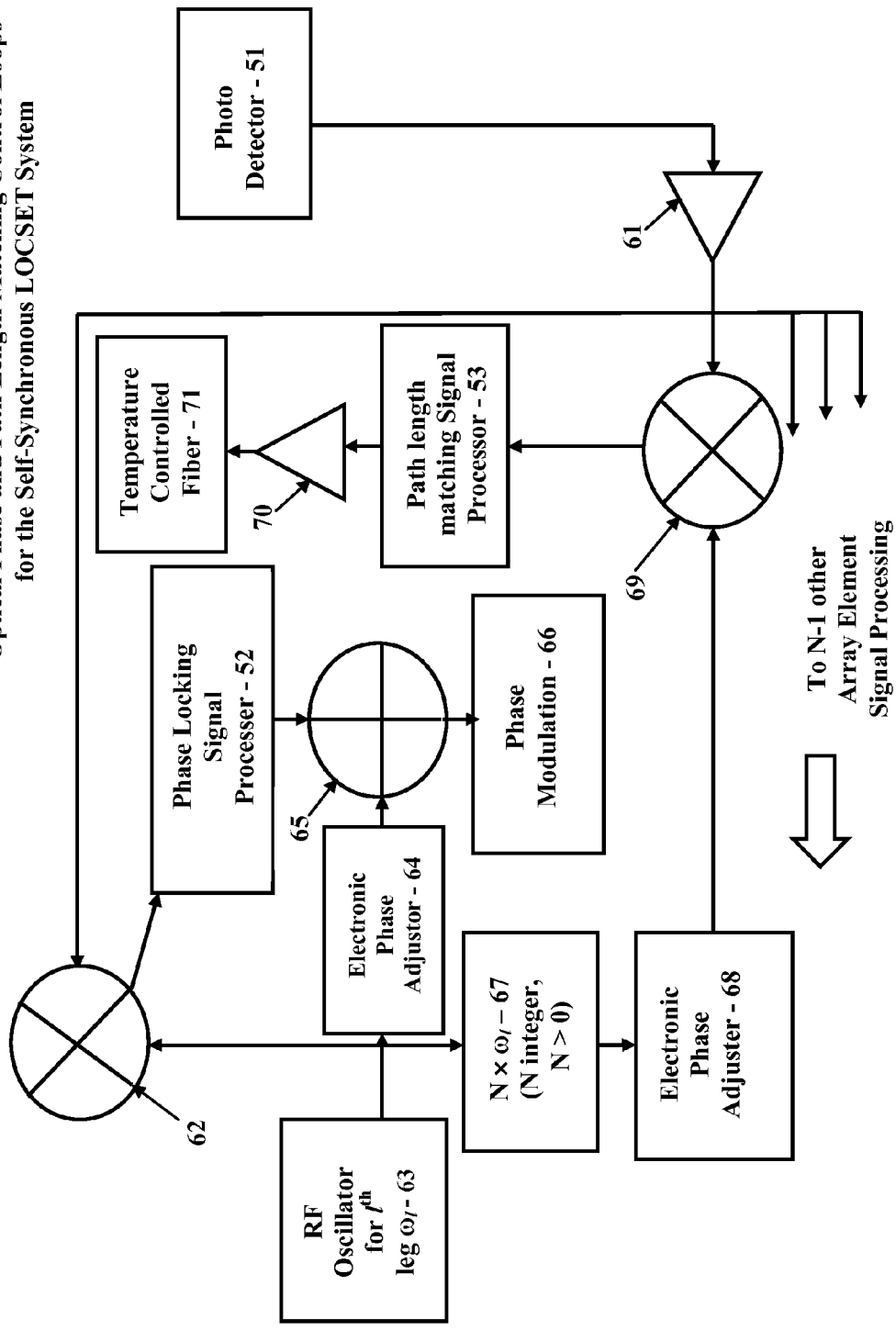
FIG. 4 is a block diagram of the optical phase and path length matching control loops for one of the block array elements of the Self-Synchronous LOCSET system with the fiber path length matching improvement.

In FIG. 4, a block diagram for the optical phase and path length matching control loops for the $l^{th}$ array element in the Self-Synchronous LOCSET system are illustrated. The output of photodetector 51 is sent to the RF amplifier 61. This signal is split and is sent to a mixer 62 associated with the optical phase matching loop and a mixer 69 associated with the path length matching loop. The RF oscillator signal 63 for the $l^{th}$ array element, $\omega_l$, is split 3 ways, first to the electronic phase adjustor 64 for optical phase matching, next to the mixer 62 associated with the optical phase matching control loop, and finally to a RF harmonic generator 67 which is associated with the path length matching loop. Note, if the first harmonic is used for both optical phase and path length matching, the RF harmonic generator 67 is not necessary. The output of the mixer 62 associated with the optical phase matching loop is sent to phase locking signal processing electronics 52. Outputs from both the phase locking signal processing electronics 52 and the electronic phase adjustor 64 are then sent to a bias tee 65 whose output is injected into a phase modulator 66 for the $l^{th}$ array element which contributes to driving the optical phase differences between the $l^{th}$ element and the other array elements to zero. For the path length matching loop, the signal from the RF harmonic generator 67 is then sent to an electronic phase adjustor 68. The signals from the electronic phase adjustors 64 and 68 accounts for electronic phase errors induced by differing lengths of the RF cables. The electronic phase adjustors 64 and 68 can be replaced by fixed cable lengths or phase delays. The signal from the electronic phase adjustor is then directed into the path length matching mixer 69 with the output of the mixer being injected into the signal processing electronics for path length matching 53. The output signal from the path length matching signal processing electronics 53 is then injected into an amplifier 70 whose output controls the $l^{th}$ array element's temperature controlled spool 71 (43 of FIG. 3). The temperature of the $l^{th}$ array element's temperature controlled spool 71 is adjusted to match the $l^{th}$ array element's path length to a mean array path length. The signal processing circuit for the path length matching control loop maximizes, $S_{PLM\_l}$, for each of the N array elements independently for even harmonics and minimizes, $S_{PLM\_l}$, for each of the N array elements independently for odd harmonics. The path length matching and the optical phase matching components are independent of each other.

Self-Referenced LOCSET System with the Fiber Path Length Matching Improvement

Figure 5:
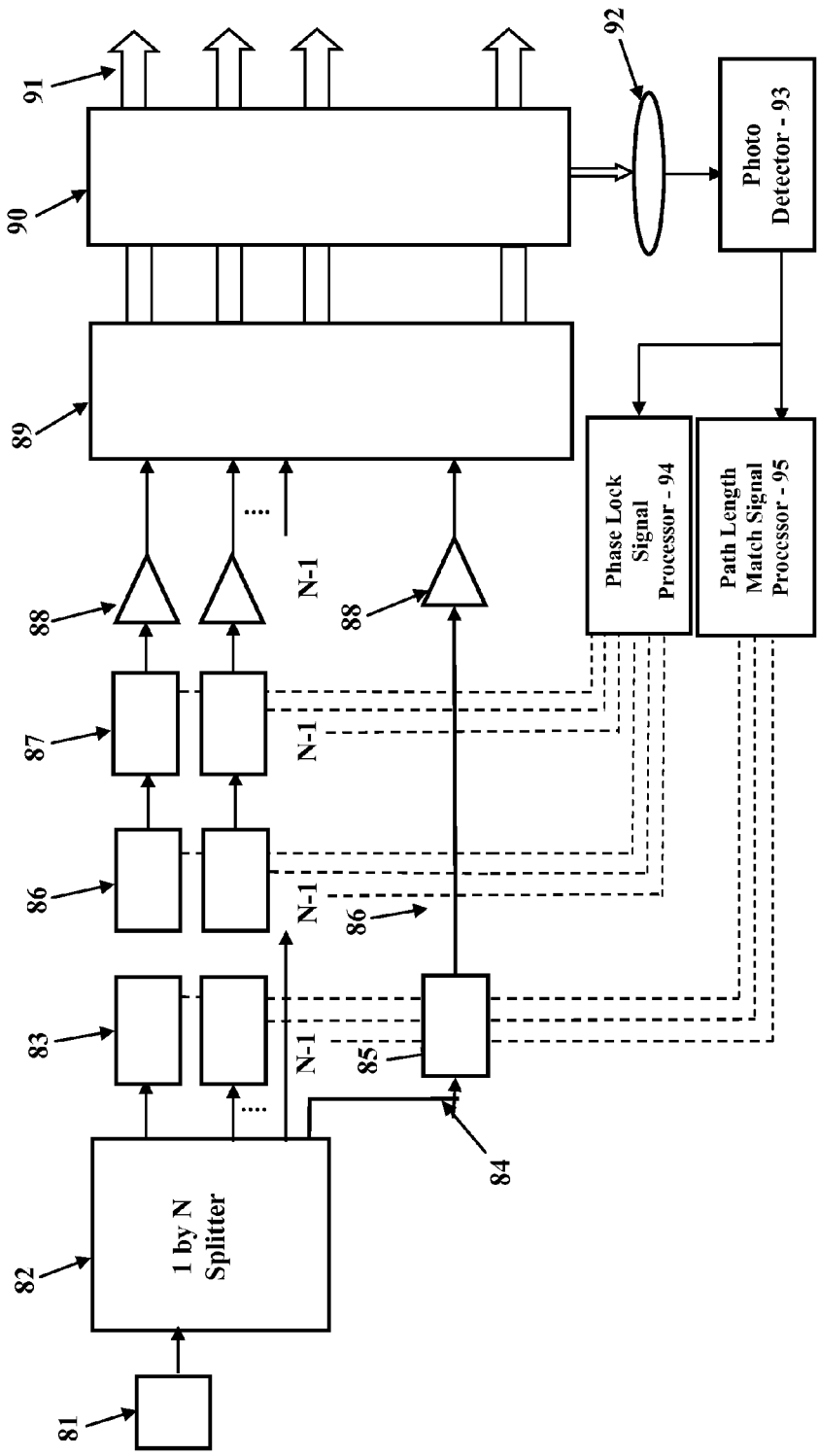
FIG. 5 is a block diagram of the Self-Referenced LOCSET system with the fiber path length matching improvement.

In the embodiment for the Self-Referenced LOCSET system with fiber path length matching improvement, M=N−1 phase modulated fiber amplifier slave legs are adjusted for both optical phase and path length matching relative to a reference leg. A block diagram of the present invention for the Self-Referenced LOCSET system with the fiber path length matching improvement is shown in FIG. 5. The first device in the diagram is a master oscillator laser 81 having a linewidth greater than the SBS linewidth. The output power from the master oscillator is divided by a 1×N power splitter 82. M output signals (slave legs) from the 1×N power splitter 82 are then directed to M temperature controlled spools of passive optical fiber 83. One output signal 84 from the 1×N power splitter (reference leg) is directed to a similar spool of passive optical fiber 85 that is not adjusted. The temperatures of each of the M fiber spools are adjusted to match the optical paths of each of the M array elements to that of the reference leg. Each of the M output signals from the M temperature controlled spools of passive optical fiber 83 are then directed to M optical modulators 86 where each of the M signals is modulated by a unique RF frequency. The modulation frequencies must be selected so that beat notes between the reference and the other M optical signals can be uniquely isolated. The M signals are then directed to M phase adjusters 87 and then to optical amplifiers 88 which are optional. The optical modulators 86 and the optical phase adjusting elements 87 can be separate devices, or they may be single devices that perform both tasks. Output of the reference leg signal from the unadjusted spool of passive fiber 85 is injected directly into an optical amplifier 88 which is optional. The N outputs from the optional optical amplifiers 88 are then directed to the array output optics 89. The relative position of the optional optical amplifiers 88, optical modulators 86, phase adjusters 87 and the temperature controlled spools of passive optical fiber 83 are in principle arbitrary. Similarly, the order of the optional optical amplifier 88 and the unadjusted spool of passive optical fiber 85 on the reference leg is also arbitrary. However, practical details such as power handling capability of individual elements, system noise characteristics, or even reduction of the modulation effectiveness by succeeding elements or thermal loading may lead to a preferred sequence of optical elements.

The N amplified outputs are either optically co-aligned or combined in the combiner/alignment optics 89 and the output is directed to the beam sampler 90. In a variation of this embodiment, the beams may be sampled before the alignment optics. In that case the beam sampler 90 may precede the co-alignment optics 89. In the case where the array output optics 89 includes a beam combiner the output may be a single beam. While the majority of the power passes through the beam splitter 90 and constitutes the array output 91, a small fraction of the array output is directed to the far field imaging optics 92 and then on to the photodetector 93. The imaging system 92 is used to image a far-field central spot onto the photodetector 93 that fills or overfills the active area of the photodetector 93. The signal-to-noise ratio for a given optical power in the sampled beam is optimized when only the central lobe of the far field is imaged onto the photodetector. However, this is not a necessary condition for achieving accurate phase control or path length matching. Excellent phase locking and path length matching can be achieved when the central lobe overfills or underfills the photodetector active area. It is only necessary that there be a sufficient signal-to-noise ratio for phase locking and path length matching.

The electrical signals from the photodetector 93 are signal processed 94 to isolate and extract the optical phase control signals for each of the M adjusted array elements. The optical phase control signals are then applied to the phase adjusting elements 87 to cancel the optical phase differences between the M array elements (slave legs) and the reference leg. Optimum performance is obtained when the array elements are all traveling in the same direction with the same divergence. However, the optimum condition is not required for excellent phase control to be demonstrated. The signal from the photodetector 93 is also sent to the path length matching signal processor 95 which sends the path length matching control signal to the temperature controlled fiber spools 83 to enable path length matching of the M slave legs to that of the reference leg. To conclude, the M slave amplifier legs are adjusted for optical phase and path length matching relative to the reference amplifier leg.

The theoretical basis for the phase locking signal processing 94 has been described in U.S. Pat. Nos. 7,187,492 B1 and 7,233,433 B1.

A method for matching the path lengths of multiple fibers is described for the Self-Referenced LOCSET system with the fiber path length matching improvement, a coherent beam combining system used to achieve a high-power laser beam. The method uses electronic feedback control of the optical path lengths in N−1 fibers to provide continuous optical path length adjustments over a wide range of path length differences with high accuracy so that efficient path length matching and phase locking can be achieved. In this embodiment, the path length and optical phase of the reference leg is unadjusted. To achieve good phase locking, the optical path length differences between the amplifier legs must be much less than the coherence length. In the present invention, the path lengths of individual fibers are matched relative to the path length of the reference leg using feedback to temperature-controlled fiber segments in N−1 amplifier legs in the array. The optical path lengths are changed by adjusting the temperature of a spool of passive optical fiber in each amplifier leg to enable expansion and contraction of the path length.

For N−1 modulated amplifier legs plus one unmodulated reference leg, the photocurrent for the self-reference LOCSET case is given by:

$$i_{PD}^{Self-Referenced} = i_{PD1} + i_{PD2} + i_{PD3} \tag{8}$$

where:

$$i_{PD1} = \left(\frac{R_{PD} \cdot P_u}{2}\right) \tag{9}$$

is the photocurrent due to the unmodulated field, $$i_{PD2} = R_{PD} \cdot \sqrt{P_u} \cdot \sum_{j=1}^{N-1} \sqrt{P_j} \cdot \tag{10}$$

$$\left( \left\{ \cos(\phi_j - \phi_u) \left( J_0(\beta_j) + 2 \cdot \sum_{n_j=1}^{\infty} J_{2n_j}(\beta_j) \cdot \cos(2 \cdot n_j \cdot \omega_j \cdot t) \right) \right\} + \left\{ \sin(\phi_j - \phi_u) \cdot 2 \cdot \sum_{n_j=1}^{\infty} J_{2n_j-1}(\beta_j) \cdot \sin((2 \cdot n_j - 1) \cdot \omega_j \cdot t) \right\} \right)$$

is the photocurrent due to beating of the N−1 modulated array elements with the unmodulated array element and, $$i_{PD3}(t) = \tag{11}$$

$$\frac{R_{PD}}{2} \sum_{l=1}^{N-1} \sqrt{P_l} \cdot \sum_{\substack{j=1 \\ j \neq l}}^{N-1} \sqrt{P_j} \cdot \left[ \left\{ \cos(\phi_l - \phi_j) \left( J_0(\beta_l) + 2 \cdot \sum_{n_l=1}^{\infty} J_{2n_l}(\beta_l) \cdot \cos(2 \cdot n_l \cdot \omega_l \cdot t) \right) \cdot \right. \right.$$

$$\left( J_0(\beta_j) + 2 \cdot \sum_{n_j=1}^{\infty} J_{2n_j}(\beta_j) \cdot \cos(2 \cdot n_j \cdot \omega_j \cdot t) \right) \right\} -$$

$$\left\{ \sin(\phi_l - \phi_j) \cdot 2 \cdot \sum_{n_l=1}^{\infty} J_{2n_l-1}(\beta_l) \cdot \right.$$

$$\text{Sin}((2 \cdot n_l - 1) \cdot \omega_l \cdot t) \cdot \left( J_0(\beta_j) + 2 \cdot \right.$$

$$\left. \sum_{n_j=1}^{\infty} J_{2n_j}(\beta_j) \cdot \text{Cos}(2 \cdot n_j \cdot \omega_j \cdot t) \right) \right\} +$$

$$\left\{ \text{Sin}(\phi_l - \phi_j) \left( J_0(\beta_l) + \right. \right.$$

$$\left. 2 \cdot \sum_{n_l=1}^{\infty} J_{2n_l}(\beta_l) \cdot \text{Cos}(2 \cdot n_l \cdot \omega_l \cdot t) \right) \cdot$$

$$\left( 2 \cdot \sum_{n_j=1}^{\infty} J_{2n_j-1}(\beta_j) \cdot \text{Sin}((2 \cdot n_j - 1) \cdot \right.$$

$$\left. \omega_j \cdot t) \right) \right\} + \left\{ \text{Cos}(\phi_l - \phi_j) \cdot \right.$$

$$2 \cdot \sum_{n_j=1}^{\infty} J_{2n_j-1}(\beta_j) \cdot \text{Sin} \left( 2 \cdot \right.$$

$$\left. n_j - 1) \cdot \omega_j \cdot t \right) \cdot \left( 2 \cdot \sum_{n_l=1}^{\infty} J_{2n_l-1}(\beta_l) \cdot \right.$$

$$\left. \text{Sin}((2 \cdot n_l - 1) \cdot \omega_l \cdot t) \right) \right\} \right]$$

is the photocurrent due to the beating of N−1 modulated array elements with each other.

In the above equations, $R_{PD}$ represents the photodetector responsivity, N−1 represents the number of modulated array elements, $\omega_l$ and $\omega_j$ represents the RF modulation frequencies of the $l^{th}$ and $j^{th}$ elements, $\phi_l$ and $\phi_j$ represent the optical phases of the modulated $l^{th}$ and $j^{th}$ array elements, $\phi_u$, represents the optical phase of the unmodulated array element, $P_l$ and $P_j$ represent the power from the $l^{th}$ and $j^{th}$ modulated array elements that are incident upon the photodetector, $P_u$ represents the power from the unmodulated array element that is incident upon the photodetector, $\beta_l$ and $\beta_j$ represent the phase modulation amplitudes of the $l^{th}$ and $j^{th}$ array elements, and $J_m(\beta)$ represents a Bessel Function of the first kind of order m.

If $\tau_p \gg 2\omega_l$ and $\tau_p \gg 2\pi/|(\omega_l-\omega_j)|$ for all l and j when j≠l then the path length error signal for the $l^{th}$ array element for an even harmonic is to an excellent approximation given by, $$S_{PLM\_l}^{even} = \tag{10}$$

$$\frac{R_{PD}}{2} \cdot \sqrt{P_l} \cdot J_{n_{even}}(\beta_j) \cdot \left( \sum_{j=1}^{N-1} J_0(\beta_j) \cdot \left[ \sqrt{P_j} \cdot \text{Cos}(\phi_j - \phi_l) \right] + 2 \cdot \sqrt{p_u} \cdot \text{Cos}(\phi_l - \phi_u) \right)$$

provided that the phases of the modulated array elements are adjusted by the feedback loop to track the phase of the unmodulated element. Similarly, for odd harmonics, the path length error signal for the $l^{th}$ array element is to an excellent approximation given by, $$S_{PLM\_l}^{odd} = \frac{R_{PD}}{2} \cdot \sqrt{P_l} \cdot J_{n_{odd}}(\beta_l) \cdot \left( \sum_{j=1}^{N-1} J_0(\beta_j) \cdot \left[ \sqrt{P_j} \cdot \text{Sin}(\phi_j - \phi_l) \right] + 2 \cdot \sqrt{p_u} \cdot \text{Sin}(\phi_l - \phi_u) \right) \tag{11}$$

again, provided that the phases of the modulated array elements are adjusted by the feedback loop to track the phase of the unmodulated element.

Figure 6:
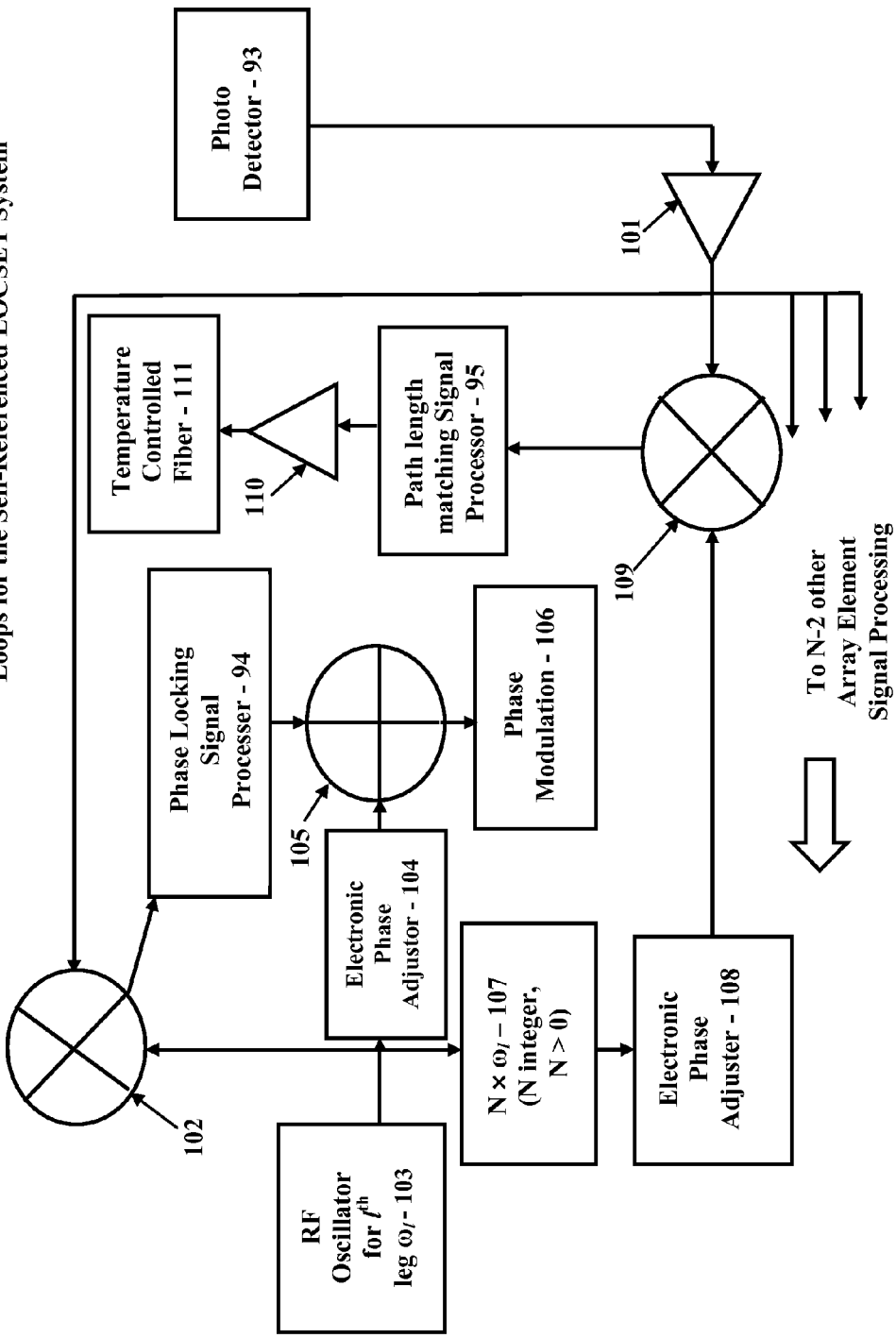
FIG. 6 is an electrical block diagram of the optical phase and path length matching control loops for one of the non-reference legs of the Self-Referenced LOCSET system with the fiber path length matching improvement.

In FIG. 6 a block diagram for the phase and path length matching control loops for the $l^{th}$ array element in the Self-Referenced LOCSET system with the fiber path length matching improvement are illustrated. The output of the photodetector 93 is sent to the RF amplifier 101. This signal is split and is sent to a mixer 102 associated with the optical phase matching loop and a mixer 109 associated with the path length matching loop. The RF oscillator signal 103 for the $l^{th}$ array element $\omega_l$ is split 3 ways, first to the electronic phase adjustor 104 for optical phase matching, next to the mixer 102 associated with the optical phase matching loop, and finally to a RF harmonic generator 107 which is associated with the path length matching loop. If the first harmonic is used both for optical phase and path length matching, the RF harmonic generator 107 can be absent. The output of the mixer 102 associated with the optical phase matching loop is sent to phase locking signal processing electronics 94. Outputs from both the phase locking signal processing electronics 94 and the electronic phase adjustor 104 are then sent to a bias tee 105 which feeds a phase modulator 106 for the $l^{th}$ array element that enables optical phase matching of the $l^{th}$ array element to the reference leg. For the path length matching loop, the signal from the RF harmonic generator 107 is then sent to an electronic phase adjustor 108. Signals from the electronic phase adjustors 104 and 108 accounts for electronic phase errors induced by differing lengths of the RF cables. The electronic phase adjustors 104 and 108 can be replaced by fixed cable lengths or phase delays. The signal from the electronic phase adjustor is then directed into the path length matching mixer 109 with the output of the mixer feeding the signal processing electronics for path length matching 95. The output signal from the path length matching signal processing electronics 95 then enters an amplifier 110 prior to being injected into the $l^{th}$ array element temperature controlled spool 111 (83 of FIG. 5). The $l^{th}$ array element's temperature controlled spool 111 is adjusted to match the $l^{th}$ array element's path length to the path length of the reference leg. For the Self-Referenced LOCSET system with the fiber path length matching improvement, N−1 fiber amplifier legs are optically phase and path length matched to the reference leg. The signal processing circuit for the path length matching control loop maximizes, $S_{PLM\_1}$, for each of the N−1 adjusted array elements independently for even harmonics and minimizes $S_{PLM\_1}$ for odd harmonics. The path length matching and the optical phase matching components are independent of each other.

Figure 7:
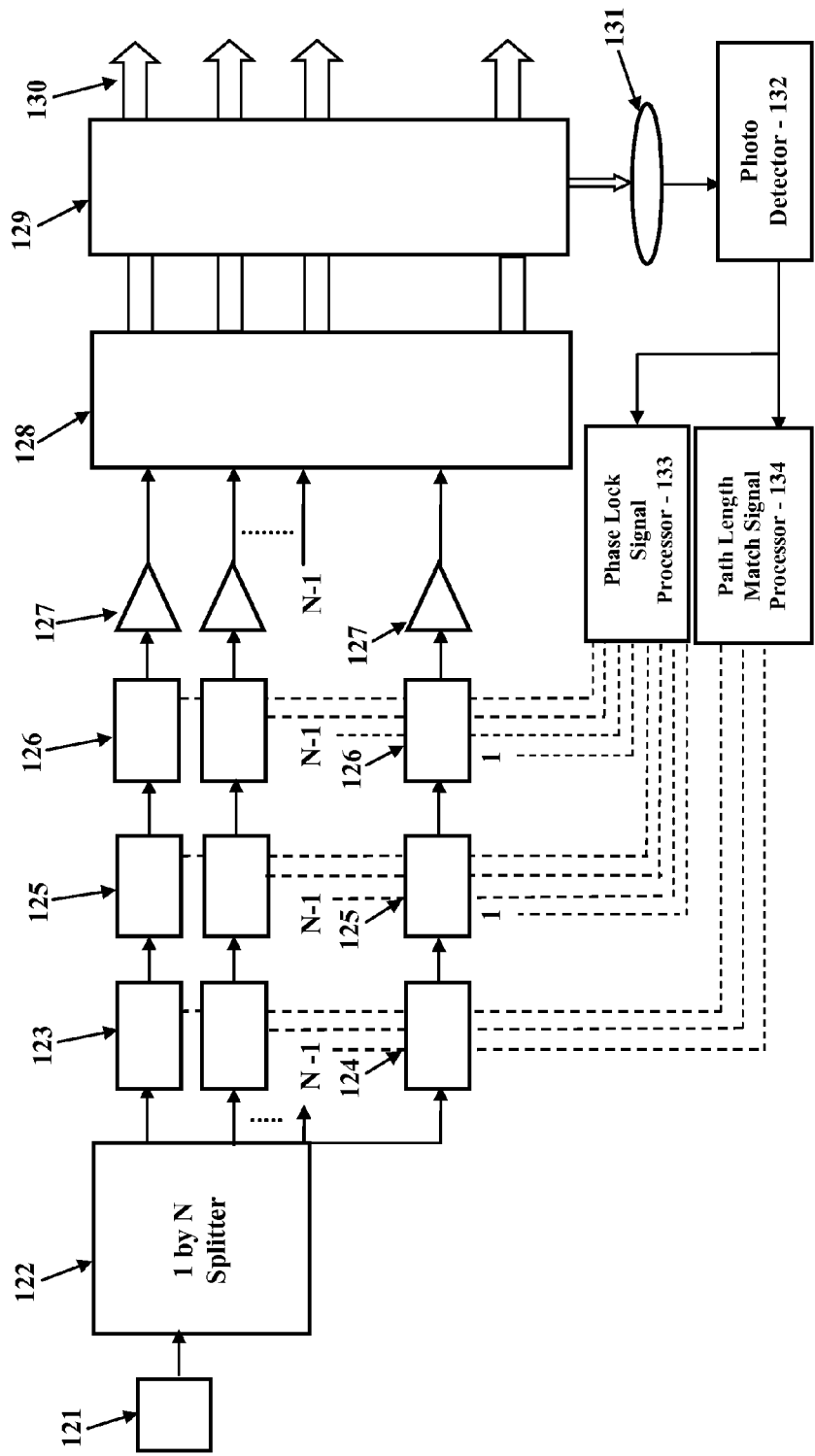
FIG. 7 is a block diagram of the hybrid Self-Synchronous Self-Referenced LOCSET system with the fiber path length matching improvement.

Hybrid Self-Synchronous Self-Referenced LOCSET System with Fiber Path Length Matching Improvement In the Hybrid Self-Synchronous Self-Referenced LOCSET system with the fiber path length matching improvement, N fiber amplifier legs are adjusted for optical phase matching while only N−1 fiber amplifier legs are adjusted for path length matching. Since all amplifier legs are equivalent, the amplifier leg chosen to be the reference (and unadjusted) for path length matching is immaterial. A block diagram of the present invention for the Hybrid Self-Synchronous Self-Referenced LOCSET system with the fiber path length matching improvement is shown in FIG. 7. The first device in the diagram is a master oscillator laser 121 having a linewidth greater than the SBS linewidth. The output power from the master oscillator is divided by a 1×N power splitter 122. M=N−1 slave signals from the 1×N power splitter 122 are then directed to M temperature controlled spools of passive fiber 123. One output signal (reference) from the 1×N power splitter is directed to a similar spool of fiber 124 that is not temperature adjusted. The temperature of each of the M temperature controlled spools is adjusted to match the optical path lengths of the slave array elements to that of the reference. Each of the M output signals from the M temperature controlled fiber spools 123 are then directed to M optical modulators 125 where each of the M signals is modulated by a unique electronic frequency. The M signals are fed to M phase adjusters 126 and then to optical amplifiers 127 which are optional. The output from the unmodulated spool of fiber 124 is also directed to an optical modulator 125 and a phase adjuster 126 before being directed to an optional optical amplifier 127. The modulation frequencies must be selected so that beat notes between the N optical signals can be uniquely isolated. The optical modulators 125 and the optical phase adjusting elements 126 can be separate devices, or they may be single devices that perform both tasks. The N outputs from the optional optical amplifiers 127 are then directed to the array output optics 128. The relative positions of the optical amplifiers 127, the optical modulators 125, the phase adjusters 126 and the temperature controlled spools 123 (or the non-temperature controlled spool 124) are in principle arbitrary. However, practical details such as power handling capability of individual elements, system noise characteristics, or even reduction of the modulation effectiveness by succeeding elements or thermal loading may lead to a preferred sequence of optical elements.

The N amplified outputs are either optically co-aligned or combined in the combiner/alignment optics 128 and the output is directed to the beam sampler 129. In a variation of this embodiment, the beams may be sampled before the alignment optics. In this case the beam sampler 129 may precede the co-alignment optics 128. In the case where the array output optics 128 includes a beam combiner the output may be a single beam. While the majority of the power passes through the beam splitter 129 and constitutes the array output 130, a small fraction of the array output is directed to the far field imaging optics 131 and then on to the photodetector 132. The imaging system 131 is used to image a far-field central spot onto the photodetector 132 that fills or overfills the active area of the photodetector 132. The signal-to-noise ratio for a given optical power in the sampled beam is optimized when only the central lobe of the far field is imaged onto the photodetector. However, this is not a necessary condition for achieving accurate phase control or path length matching. Excellent phase locking and path length matching can be achieved when the central lobe overfills or underfills the photodetector active area. It is only necessary that there be a sufficient signal-to-noise ratio for phase locking and path length matching.

The electrical signals from the photodetector 132 are signal processed 133 to isolate and extract the optical phase control signals for each array element, and the optical phase control signals are then applied to the phase adjusting elements 126 for N array elements to cancel the phase differences between the array elements. Optimum performance is obtained when the array elements are all traveling in the same direction with the same divergence. However, the optimum condition is not required for excellent phase control to be demonstrated. The signal from the photodetector 132 is also sent to the path length matching signal processor 134 which sends the path length matching control signal to the temperature controlled fiber spools 123 for the M slave elements. The path lengths of the M slave array elements are matched to the path length of the reference leg.

The theoretical basis for the phase locking signal processing 133 has been described in U.S. Pat. No. 7,058,098 B1.

A method for matching the path lengths of multiple fibers is next described for the Hybrid Self-Synchronous Self-Referenced LOCSET system with the fiber path length matching improvement, a coherent beam combining system used to achieve a high-power laser beam. The method uses electronic feedback control of the optical phase in N fibers in the Self-Synchronous configuration and the optical path lengths in N−1 fibers in a Self-Referenced configuration to provide continuous optical path length adjustments over a wide range of path length differences with high accuracy so that efficient path length matching and phase locking can be achieved. To achieve good phase locking the optical path length differences between the amplifier legs must be much less than the coherence length. In the present invention, the path lengths of N−1 slave fibers are matched relative to the path length of a reference leg via feedback which enables expansion and contraction of passive fiber on temperature controlled spools in the slave legs.

In the Hybrid Self-Synchronous Self-Referenced LOCSET system with the fiber path length matching improvement embodiment, the optical phases are adjusted on N amplifier legs while the optical path lengths are adjusted on only N−1 amplifier legs. The process is governed by the equations describing Self-Synchronous LOCSET, equations 3-7. In this embodiment, the electronics strive to drive the optical phase differences between N amplifier legs to zero. For path length matching, the electronics strive to minimize the path length differences between the temperature adjusted slave legs and the reference leg. Because temperature is not adjusted on the reference leg and therefore the path length of that leg is not corrected, the amount of pull-in of the adjusted slave legs toward the reference (unadjusted) leg by the electronics is strengthened since the difference $\phi_j-\phi_u$ ($\phi_j$ represents the phase of an adjusted leg and $\phi_u$ represents the phase of the reference leg) is greater than it otherwise would be if $\phi_j$ were adjusted for path length matching.

Figure 8:
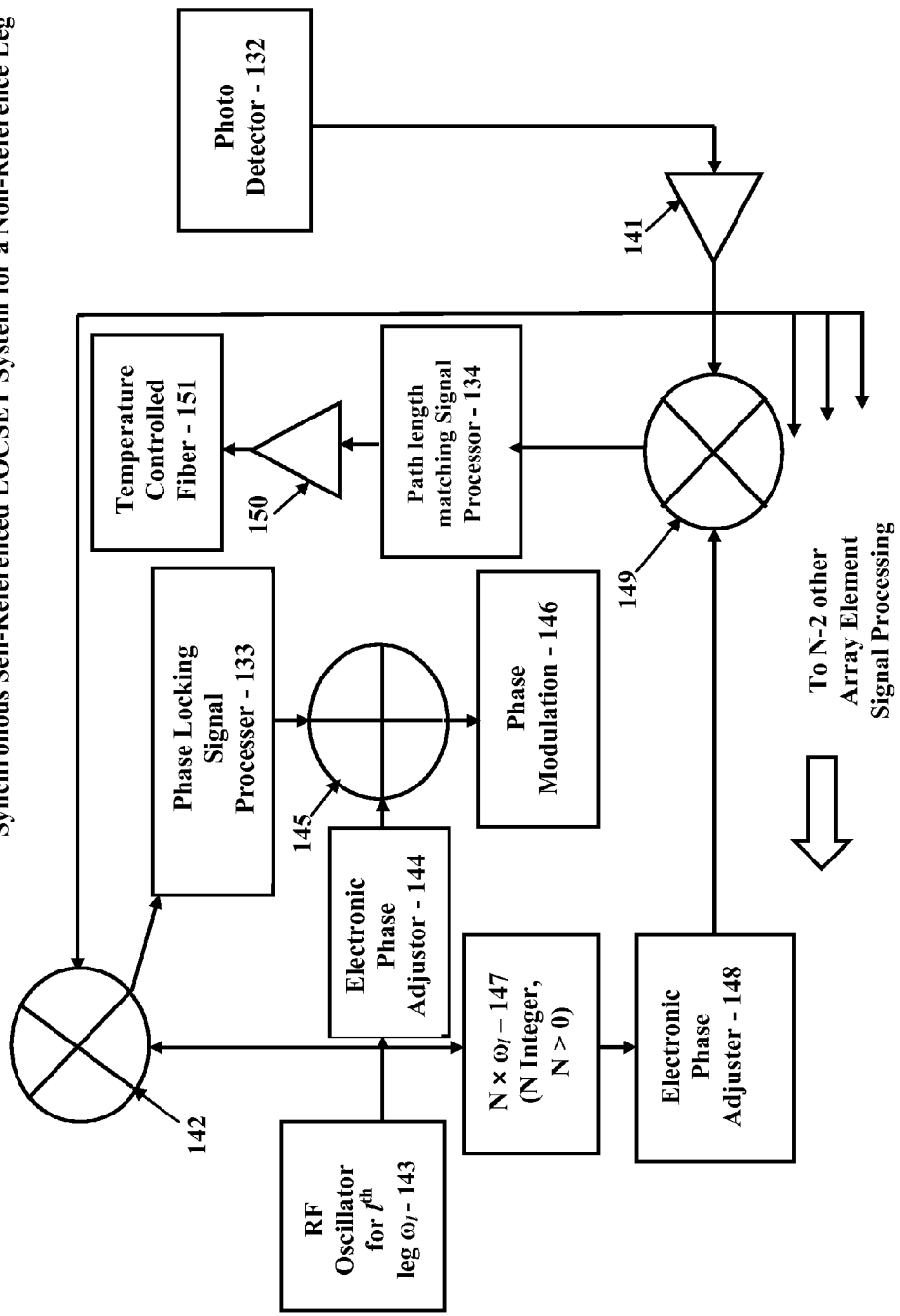
FIG. 8 is an electrical block diagram of the optical phase and path length matching control loops of a non-reference leg for path length matching purposes in the hybrid Self-Synchronous Self-Referenced LOCSET system with the fiber path length matching improvement.

In FIG. 8, a block diagram of a non-reference leg for path length matching purposes, i.e., where both the optical phase and path length are adjusted, in the Hybrid Self-Synchronous Self-Referenced LOCSET system with the fiber path length matching improvement is illustrated. For amplifier legs where both the optical phase and the path length are adjusted, the output of photodetector 132 is sent to the RF amplifier 141. This signal is split and is sent to a mixer 142 associated with the optical phase matching loop and a mixer 149 associated with the path length matching loop. The RF oscillator 143 signal for the $l^{th}$ array element $\omega_l$ is split 3 ways, first to the electronic phase adjustor 144 for optical phase matching, next to the mixer 142 associated with the optical phase matching loop, and finally to a RF harmonic generator 147 which is associated with the path length matching loop. If the first harmonic is used for both optical phase and path length matching, the RF harmonic generator 147 can be absent. The output of the mixer 142 associated with the optical phase matching loop is sent to phase locking signal processing electronics 133. Outputs from both the phase locking signal processing electronics 133 and the electronic phase adjustor 144 are then sent to a bias tee 145 which feeds a phase modulator 146 for the $l^{th}$ array element which contributes to driving the optical phase differences between the array elements to zero. For the path length matching loop, the signal from the RF harmonic generator 147 is then sent to an electronic phase adjustor 148. Signals from the electronic phase adjustors 144 and 148 accounts for electronic phase errors induced by differing lengths of the RF cables. The electronic phase adjustors 144 and 148 can be replaced by fixed cable lengths or phase delays. The signal from the electronic phase adjustor is then directed into the path length matching mixer 149 with the output of the mixer feeding the signal processing electronics for path length matching 134. The output signal from the path length matching signal processing electronics 134 is passed through an amplifier 150 before being directed to the $l^{th}$ array element temperature controlled spool 151 (123 of FIG. 7). The $l^{th}$ array element temperature controlled spool 151 is adjusted to match the $l^{th}$ array element's path length to the path length of the reference leg. The signal processing circuit for the path length matching control loop maximizes, $S_{PLM\_l}$, for each of the N−1 modulated array elements independently for even harmonics and minimizes $S_{PLM\_l}$ for odd harmonics. The path length matching and the optical phase matching components are independent of each other.

Figure 9:
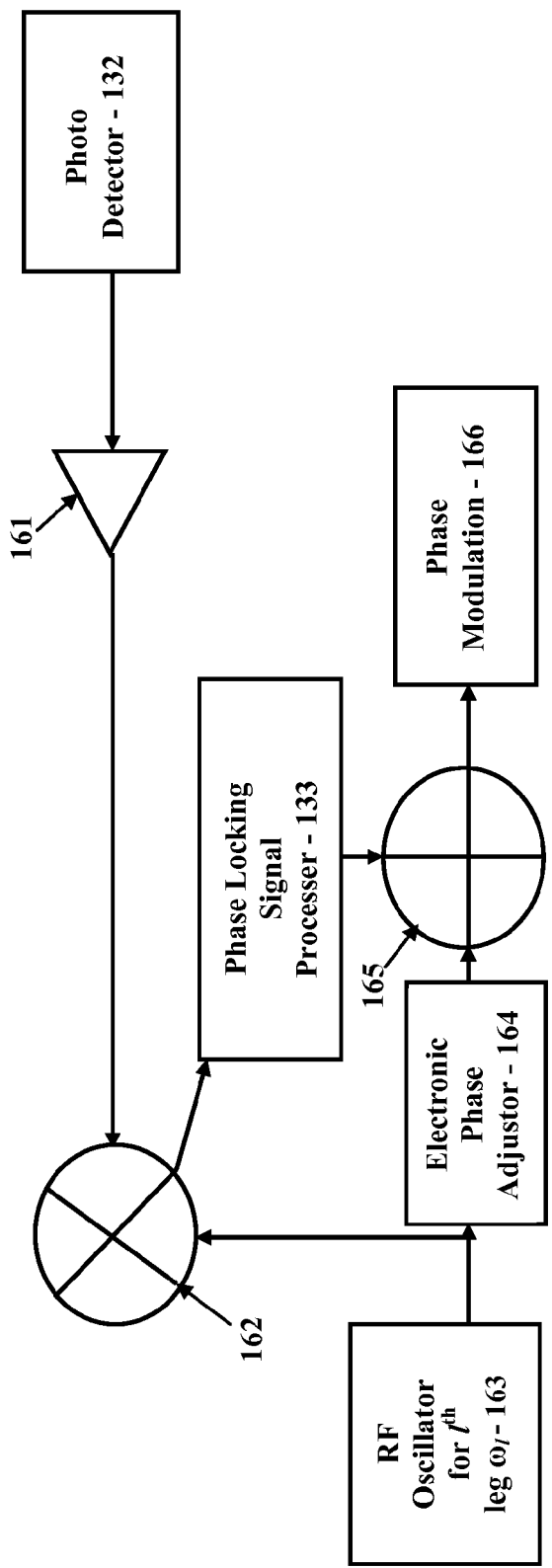
FIG. 9 is an electrical block diagram of the optical phase matching control loop for the array element of the reference leg for path length matching purposes in the Hybrid Self-Synchronous Self-Referenced LOCSET system with the fiber path length matching improvement.

FIG. 9 represents the case of the leg that is adjusted for optical phase matching but is the reference (or unadjusted) leg for path length matching. For this leg, only the circuitry required for optical phase matching is necessary. That is, the output of photodetector 132 is sent to the RF amplifier 161. This signal is then sent to a mixer 162 associated with the optical phase matching loop. The RF oscillator 163 signal for the $l^{th}$ array element $\omega_l$ is split 2 ways, to the electronic phase adjustor 164 for optical phase matching and to the mixer 162. The signal from the electronic phase adjuster 164 accounts for electronic phase error induced by differing lengths of the RF cables. The output of the mixer 162 associated with the optical phase matching loop is sent to phase locking signal processing electronics 133. Outputs from both the phase locking signal processing electronics 133 and the electronic phase adjustor 164 are then sent to a bias tee 165 which feeds a phase modulator 166 for the $l^{th}$ array element that contributes to driving the optical phase differences between the array elements to zero.

The invention claimed is:

1. A method of implementing a coherent laser beam combining system based on a Self-Synchronous LOCSET system in which the output of a master oscillator laser having a linewidth broader than the Stimulated Brillouin Scattering linewidth is split into N signals and fed into an array of N optical fibers, each being an amplifier leg, that are adjusted to minimize their optical phase and path length differences, the method comprising:
    a. feeding said N signals into N temperature controlled spools of passive fiber, wherein the temperature of each of the fiber spools is adjusted to enable expansion and contraction of the optical fiber thereby controlling the length of each passive fiber;
    b. phase modulating each of said N signals at a unique RF frequency, wherein the modulation frequencies are selected such that a phase error signal for each of the N array elements can be uniquely isolated;
    c. feeding said N array element signals to N optical phase adjusters to enable adjustment of the phase to an array mean approaching zero;
    d. optically amplifying the output of said N phase adjusters;
    e. feeding said N amplified signals to alignment optics;
    f. feeding the N output signals of said alignment optics to a beam sampler, wherein a small portion of the alignment optics output signals is split off and imaged onto a photodetector with the remainder of the alignment optics output signals being passed through the beam sampler to become the final output;
    g. directing a portion of an output signal of said photodetector to a signal processor to isolate and extract N unique optical phase error signal amplitudes;
    h. directing said N optical phase error signals to said N optical phase adjusters to provide stable negative feedback to said N optical phase adjusters to minimize phase errors between the various amplifier legs; and
    i. directing a portion of an output signal of said photodetector to a path length matching signal processor which uses a harmonic of the RF modulation frequencies for each of the N signals to provide an error correction for each of the N temperature controlled fiber spools, whereby the N optical path lengths are matched to a mean array path length producing a high-powered optically-coherent final output signal.

2. The method of implementing a coherent laser beam combining system based on a Self-Referenced LOCSET system in which the output of a master oscillator laser having a linewidth broader than the Stimulated Brillouin Scattering linewidth is split into N−1 signals and fed into an array of N−1 optical fibers, each being an amplifier leg, and one signal designated a reference amplifier leg, the method comprising:
    a. feeding said N signals into temperature-controlled spools of passive fiber on N−1 slave legs and one spool of passive fiber which is not temperature controlled on a reference leg wherein the N−1 temperature controlled fiber spools are adjusted to enable expansion and contraction of the optical fiber thereby controlling the length of each N−1 passive fibers;
    b. phase modulating each of said N−1 slave signals at a unique RF frequency, wherein the modulation frequencies are selected such that a phase error signal for each of the N−1 array elements can be uniquely isolated;
    c. feeding said N−1 slave array element signals each having a unique RF frequency to N−1 optical phase adjusters to enable adjustment of the optical phases to that of the reference;
    d. optically amplifying the output of said N−1 slave phase adjusters on the non-reference legs as well as the output of the non-adjusted reference leg;
    e. feeding said N amplified signals to alignment optics;
    f. feeding the N output signals of said alignment optics to a beam sampler, wherein a small portion of the alignment optics output signals is split off and imaged onto a photodetector and the remainder of the alignment optics output signals are passed through the beam sampler and become the final output;
    g. directing a portion of the an output signal of said photodetector to a signal processor to isolate and extract N−1 unique optical phase error signal amplitudes for the non reference legs;
    h. directing said N−1 optical phase error signals to said N−1 optical phase adjusters on said slave legs to provide stable negative feedback to said N−1 optical phase adjusters to enable optical phase matching between the slave legs and the reference leg; and
    i. directing a portion of said output signal of said photodetector to a path length matching signal processor which uses a harmonic of the N−1 uniquely RF modulated signals on the non-reference legs to drive each of the N−1 modulated temperature controlled fiber spools, whereby the N−1 optical path lengths of the non-reference legs are matched to that of the reference leg to produce a high-powered optically-coherent final output signal.

3. The method of implementing a coherent laser beam combining system based on a hybrid Self-Synchronous Self-Referenced LOCSET system in which the output of a master oscillator laser having a linewidth broader than the Stimulated Brillouin Scattering linewidth is split into N signals and fed into an array of N optical fibers, each being an amplifier leg, and one signal designated a reference amplifier leg, the method comprising:
   a. feeding said N signals into N−1 temperature controlled spools of passive fiber designated slave legs and one reference spool of passive fiber that is not temperature controlled designated the reference leg, wherein the N−1 temperature controlled fiber spools are adjusted to enable expansion and contraction of the optical fiber thereby controlling the length of each N−1 passive fibers;
   b. phase modulating each of said N signals at a unique RF frequency, wherein the modulation frequencies are selected such that a phase error signal for each of the N array elements can be uniquely isolated;
   c. feeding said N array element signals to N optical phase adjusters to enable the optical phases to be adjusted to an array mean approaching zero;
   d. optically amplifying the output of said N phase adjusters;
   e. feeding said N amplified signals to alignment optics;
   f. feeding the N output signals of said alignment optics to a beam sampler, wherein a small portion of the alignment optics output signals is split off and imaged onto a photodetector and the remainder of the alignment optics output signals are passed through the beam sampler and become the final output;
   g. directing a portion of an output signal of said photodetector to a signal processor to isolate and extract N unique optical phase error signal amplitudes for each of the N sampled signals;
   h. directing said N optical phase error signals to said N optical phase adjusters to provide stable negative feedback to said N optical phase adjusters to enable minimization of optical phase errors between array legs; and
   i. directing a portion of the output signal of said photodetector to a path length matching signal processor using a harmonic of the N−1 uniquely RF modulated signals to drive each of the N−1 modulated temperature controlled fiber spools, whereby the N−1 optical path lengths of the non-reference legs are matched to that of the reference leg to produce a high-powered optically-coherent final output signal.

* * * * *